(12) United States Patent
Yamagishi

(10) Patent No.: US 12,632,200 B2
(45) Date of Patent: May 19, 2026

(54) IMAGE FORMING APPARATUS THAT MANAGES LOG FOR USE IN CALCULATING USAGE FEE, CONTROL METHOD FOR IMAGE FORMING APPARATUS, AND STORAGE MEDIUM

(71) Applicant: CANON KABUSHIKI KAISHA, Tokyo (JP)

(72) Inventor: Yoshihiro Yamagishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 18/496,783

(22) Filed: Oct. 27, 2023

(65) Prior Publication Data

US 2024/0177128 A1     May 30, 2024

(30) Foreign Application Priority Data

Nov. 30, 2022    (JP) ................................. 2022-192137

(51) Int. Cl.
G06F 3/12          (2006.01)
H04N 1/34         (2006.01)
G06Q 20/14       (2012.01)

(52) U.S. Cl.
CPC .......... G06F 3/1234 (2013.01); G06F 3/1207 (2013.01); G06F 3/121 (2013.01); G06F 3/1239 (2013.01); G06F 3/1273 (2013.01); H04N 1/346 (2013.01); G06Q 20/145 (2013.01)

(58) Field of Classification Search
CPC ...... G06F 3/1234; G06F 3/1207; G06F 3/121; G06F 3/1239; G06F 3/1273; H04N 1/34–348; G06Q 20/145
See application file for complete search history.

(56) References Cited

U.S. PATENT DOCUMENTS

| | | | | |
|---|---|---|---|---|
| 7,124,094 B1* | 10/2006 | Kobayashi | ............ | G06F 3/1238 |
| | | | | 705/317 |
| 2006/0279644 A1* | 12/2006 | Toda | ......................... | H04N 1/34 |
| | | | | 348/231.6 |
| 2008/0181651 A1* | 7/2008 | Takesada | .............. | G06F 3/1241 |
| | | | | 399/82 |
| 2009/0109462 A1* | 4/2009 | Hiruma | ................ | G06Q 20/382 |
| | | | | 358/1.15 |

(Continued)

FOREIGN PATENT DOCUMENTS

JP          4499491 B2     7/2010

*Primary Examiner* — Nicholas Pachol
(74) *Attorney, Agent, or Firm* — Venable LLP

(57) ABSTRACT

An image forming apparatus that ensures a log for use in calculating a usage fee is properly stored in a nonvolatile memory of the apparatus. When an image sensor detects completion of drawing on a recording medium by a printing unit while a chargeable job is executed, a flag is updated to a first state. Then, an output unit is instructed to output the recording medium, and monitoring of an output sensor is started. When the output sensor no longer detects the recording medium after the output unit is instructed to output the recording medium, the flag is updated to a second state and the log is updated. In a case where an error occurs during the detection of the recording medium by the output sensor after the output unit is instructed to output the recording medium, the chargeable job is terminated without the log being updated.

10 Claims, 13 Drawing Sheets

121

(56)          References Cited

U.S. PATENT DOCUMENTS

| | | | |
|---|---|---|---|
| 2009/0316179 A1* | 12/2009 | Amiya | G06Q 20/28 |
| | | | 358/1.14 |
| 2010/0058123 A1* | 3/2010 | Yamashirodani | G06F 11/0733 |
| | | | 714/48 |
| 2010/0067046 A1* | 3/2010 | Tsukada | G06Q 20/145 |
| | | | 358/1.15 |
| 2011/0164270 A1* | 7/2011 | Lee | G06F 3/1203 |
| | | | 358/1.14 |
| 2020/0189867 A1* | 6/2020 | Kawai | G03G 15/231 |
| 2021/0158427 A1* | 5/2021 | Jobetto | G06F 3/1273 |
| 2022/0021786 A1* | 1/2022 | Tickler | G06F 3/1222 |
| 2023/0031029 A1* | 2/2023 | Hotta | G06F 3/1285 |

* cited by examiner

IMAGE FORMING APPARATUS THAT MANAGES LOG FOR USE IN CALCULATING USAGE FEE, CONTROL METHOD FOR IMAGE FORMING APPARATUS, AND STORAGE MEDIUM

BACKGROUND OF THE INVENTION

Field of the Invention

The present disclosure relates to image forming apparatuses, control methods for the image forming apparatuses, and storage media, and in particular to image forming apparatuses for which a usage fee is determined based on a log, control methods for the image forming apparatuses, and storage media.

Description of the Related Art

Services in which a usage fee for an image forming apparatus is determined based on a log are known, where examples of the log include the number of sheets printed by the image forming apparatus, the number of times that color printing has been performed, the number of times that monochrome printing has been performed, and the number of times that printing has been performed with respect to each of functions such as printing and copying. In such services, logs are typically stored in a nonvolatile memory so that they can be held even after the supply of power to the image forming apparatus is stopped.

Japan Patent No. 4499491 discloses a technique for correctly counting the number of sheets printed by an image forming apparatus even if the supply of power to the image forming apparatus is stopped during printing, while overcoming speed limitations on a nonvolatile memory that is generally slow.

According to the technique described in Japan Patent No. 4499491, however, there may be cases where the number of printed sheets is not correctly counted, depending on the time at which the value of a counter for use in calculating the number of printed sheets is incremented, and there is room for improvement in this respect. For example, in some cases where the value of the counter is incremented when the output of one sheet from the apparatus is completed, the supply of power to the image forming apparatus may be stopped during the output of a sheet on which drawing has been completed. Such a sheet is not counted as a printed sheet. In some cases where the value of the counter is incremented when drawing on a sheet is completed, the sheet is counted as a printed sheet even if an error such as a jam that is not a user's fault occurs while the sheet is being output.

SUMMARY OF THE INVENTION

The disclosure is directed to image forming apparatuses capable of causing a nonvolatile memory to properly store a log for use in calculating a usage fee, control methods for the image forming apparatuses, and storage media.

According to an aspect of the disclosure, an image forming apparatus includes a printing unit that performs drawing on a recording medium, an image sensor that detects completion of drawing on a recording medium by the printing unit, an output unit that outputs a recording medium, and an output sensor that detects a status of output of a recording medium by the output unit. The image forming apparatus further includes a nonvolatile memory that stores first information for use in calculating a usage fee for the image forming apparatus and second information indicating whether or not drawing on the recording medium by the printing unit is completed, a memory storing instructions, and at least one processor. The at least one processor executes the instructions to, when the image sensor detects completion of drawing on a recording medium by the printing unit during execution of a chargeable job, carry out a first updating process. The first updating process includes updating the second information to a first state indicating completion of the drawing. The at least one processor further executes the instructions to, after the second information is updated to the first state, carry out a first output starting process. The first output starting process includes instructing the output unit to output the recording medium and starting monitoring of the output sensor. The at least one processor further executes the instructions to carry out a second updating process in a case where the output sensor being monitored no longer detects the recording medium after the output unit is instructed to output the recording medium in the first output starting process. The second updating process includes updating the second information to a second state which is different from the first state and updating the first information. The at least one processor further executes the instructions to terminate the chargeable job without updating the first information in a case where an error occurs in the image forming apparatus during detection of output of the recording medium by the output sensor being monitored after the output unit is instructed to output the recording medium in the first output starting process.

According to another aspect of the disclosure, a control method for the above-described image forming apparatus is provided. The control method includes, upon the image sensor detecting completion of drawing on a recording medium by the printing unit during execution of a chargeable job, carrying out a first updating process. The first updating process includes updating the second information to a first state indicating completion of the drawing. The control method further includes, after the second information is updated to the first state, carrying out a first output starting process. The first output starting process includes instructing the output unit to output the recording medium and starting monitoring of the output sensor. The control method further includes carrying out a second updating process in a case where the output sensor being monitored no longer detects the recording medium after the output unit is instructed to output the recording medium in the first output starting process. The second updating process includes updating the second information to a second state which is different from the first state and updating the first information. The control method further includes terminating the chargeable job without updating the first information in a case where an error occurs in the image forming apparatus during detection of output of the recording medium by the output sensor being monitored after the output unit is instructed to output the recording medium in the first output starting process.

According to the disclosure, the image forming apparatus ensures that a log for use in calculating a usage fee is properly stored in the nonvolatile memory.

Further features of the present disclosure will become apparent from the following description of exemplary embodiments with reference to the attached drawings.

BRIEF DESCRIPTION OF THE DRAWINGS

FIG. 1 is an external view of a printer as an image forming apparatus according to the disclosure.

FIG. 5 is a flowchart of a printing process according to the first embodiment, which is carried out in the printer.

FIG. 8 is a flowchart of a number-of-printed-sheets updating process according to the first embodiment, which is carried out in the printer at power-on.

FIG. 11 is a flowchart of a number-of-printed-sheets updating process according to the second embodiment, which is carried out in the printer at power-on.

DESCRIPTION OF THE EMBODIMENTS

Figure 2:
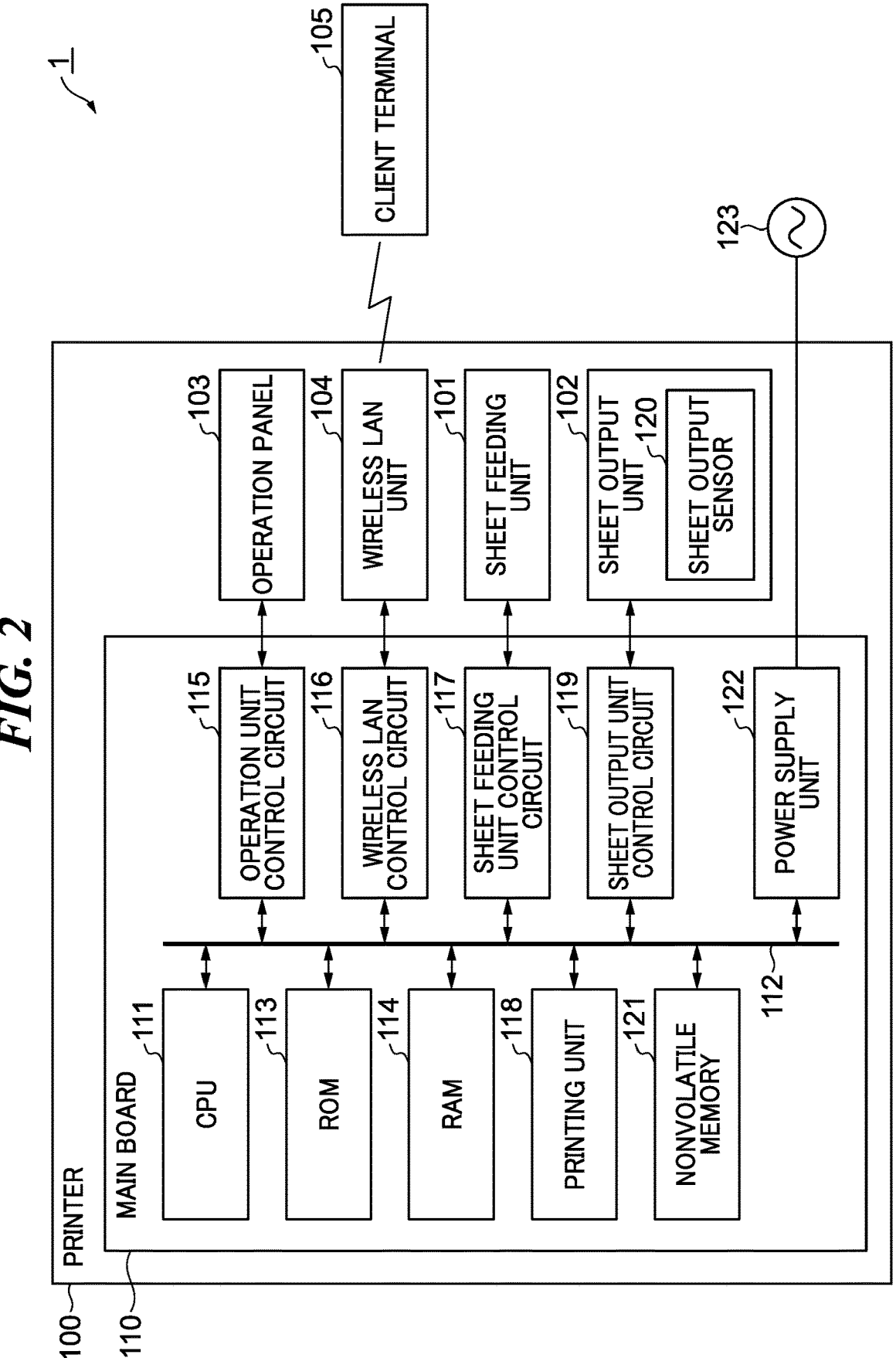
FIG. 2 is a diagram illustrating a configuration of an image processing system including the printer.

A detailed description of embodiments will now be given with reference to the accompanying drawings. It should be noted that the embodiments described below do not limit the present invention defined by the scope of claims for patent. The embodiments described below have a plurality of features, but all of these features are not necessarily essential to the present invention, and the features may be arbitrarily combined together. Moreover, the same or similar components are designated by the same reference numerals in the accompanying drawings, and description thereof is omitted.

First Embodiment

A detailed description will now be given of a first embodiment.

Figure 1:
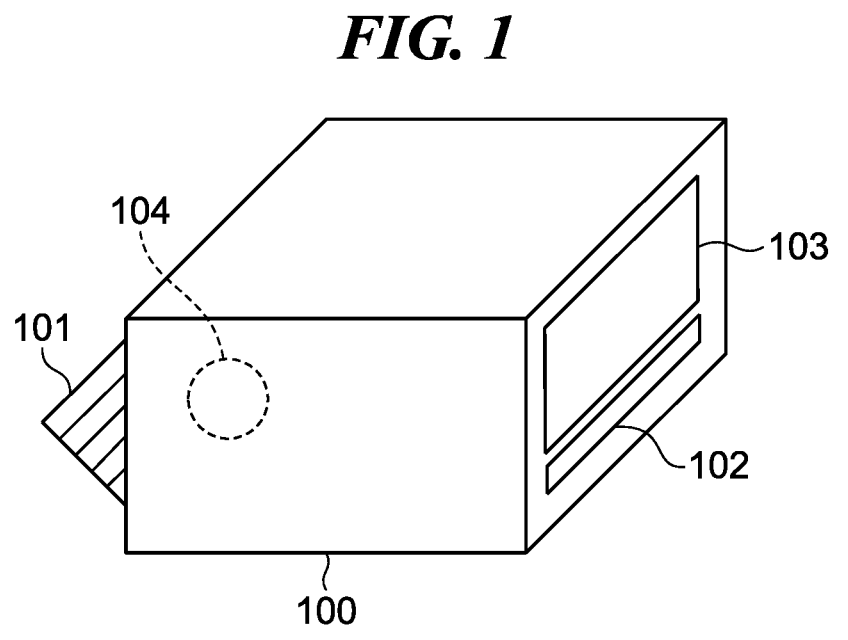

FIG. 1 is an external view of a printer 100 as an image forming apparatus in the first embodiment. It is assumed that in the first embodiment described below, the printer 100 is a single-function printer (SFP) that has only a printing function.

As illustrated in FIG. 1, the printer 100 includes a sheet feeding unit 101, a sheet output unit 102, an operation panel 103, and a wireless LAN unit 104.

The sheet feeding unit 101 has an insertion slot in which sheets of various sizes are placed. The sheet feeding unit 101 is configured to convey sheets placed in itself one by one to a printing unit 118 (FIG. 2) inside the printer 100 so that the sheets can be subjected to desired printing and then output from the sheet output unit 102 (output unit).

The operation panel 103 is located on a front surface of the printer 100. The wireless LAN unit 104 for carrying out communications via a wireless LAN is installed inside the printer 100 although it is not visible from the outside.

FIG. 2 is a diagram illustrating a configuration of an image processing system 1 including the printer 100.

The image processing system 1 includes the printer 100 described above with reference to FIG. 1 and a client terminal 105.

As illustrated in FIG. 2, the printer 100 includes a main board 110, the sheet feeding unit 101, the sheet output unit 102, the operation panel 103, and the wireless LAN unit 104. The main board 110 includes a CPU 111, a ROM 113, a RAM 114, an operation unit control circuit 115, a wireless LAN control circuit 116, a sheet feeding unit control circuit 117, the printing unit 118, a sheet output unit control circuit 119, a nonvolatile memory 121, and a power supply unit 122.

The CPU 111, which is a CPU in the form of a microprocessor, is located on the main board 110 and is configured to control the entire printer 100. The CPU 111 operates in accordance with control programs stored in the ROM 113 and the contents of data stored in the RAM 114, where the ROM 113 functions as a program memory and is connected to the CPU 111 via an internal bus 112, and the RAM 114 functions as a data memory and is connected to the CPU 111 via the internal bus 112.

The CPU 111 is configured to control the operation unit control circuit 115 to cause the operation panel 103 to display the status of the printer 100, display a function selection menu, and receive user's operations performed on the panel. The CPU 111 is further configured to control the wireless LAN unit 104 through the wireless LAN control circuit 116, so as to carry out wireless LAN communications with the external client terminal 105 like a personal computer, a workstation, or the like. The CPU 111 is further configured to control the sheet feeding unit control circuit 117 to cause the sheet feeding unit 101 to feed a sheet into the printer 100 and then convey the sheet to the printing unit 118. The CPU 111 is further configured to control the printing unit 118 to print (draw) images on the sheet (recording medium) fed from the sheet feeding unit 101. The CPU 111 is further configured to control the sheet output unit control circuit 119 to take in the sheet from the printing unit 118 and feed it to the sheet output unit 102.

The sheet output unit 102 is equipped with a sheet output sensor 120 (output sensor) configured to detect a status of the output of a sheet by the sheet output unit 102, or whether or not a sheet has been output by the sheet output unit 102 (the presence or absence of a sheet in the sheet output unit 102).

The nonvolatile memory 121, which is comprised of a flash memory or the like, is configured to store data such as a log 202 (FIG. 4), which will be described later, used even after the printer 100 is powered off. The power supply unit 122 is configured to be connected to an external AC commercial power supply 123 (AC mains power supply) to supply power to the printer 100.

Figure 3:
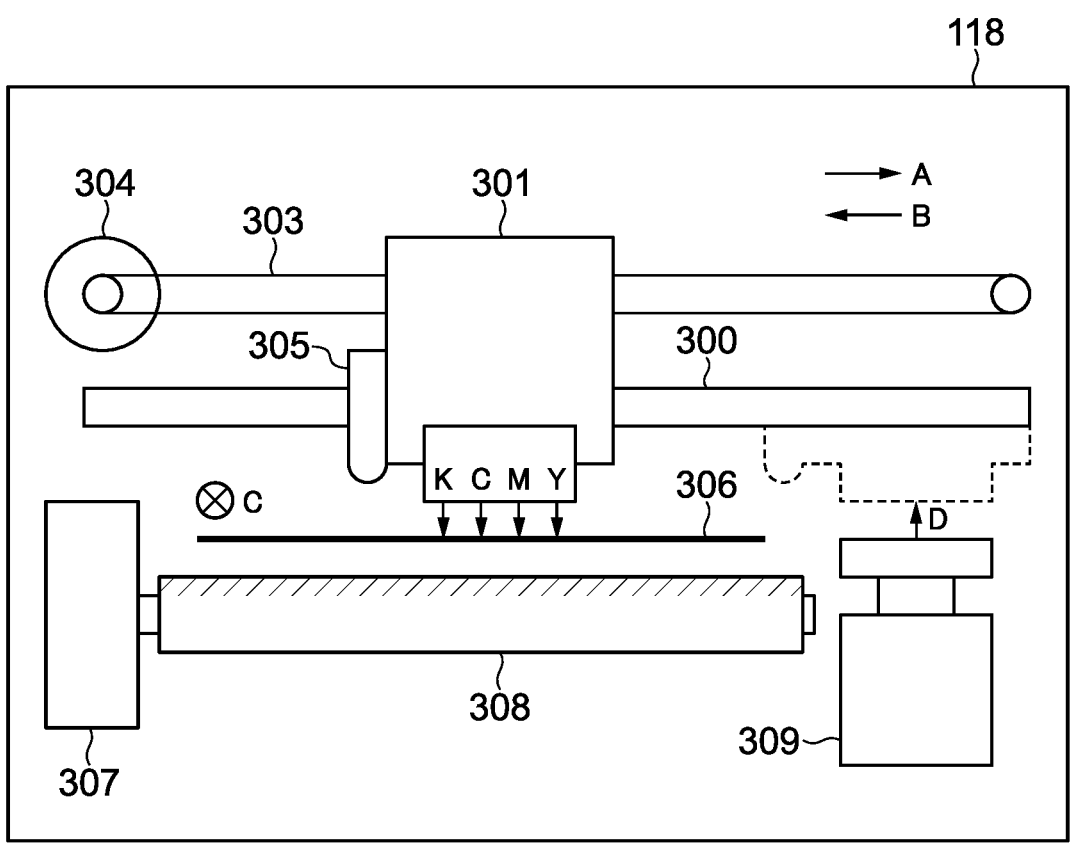
FIG. 3 is a view illustrating an internal configuration of a printing unit in the printer.

FIG. 3 is a view illustrating an internal configuration of the printing unit 118 in the printer 100.

Referring to FIG. 3, the printing unit 118, which is a print engine configured to perform drawing on recording media such as sheets, includes a guide shaft 300, a carriage 301, an inkjet recording head 302, a belt 303, a carriage motor 304, a sensor 305, a conveyor motor 307, a conveyor roller 308, and a recovery mechanism 309.

The carriage 301 is movable back and forth on the guide shaft 300 in directions indicated by arrows A and B in FIG. 3. The inkjet recording head 302 installed on the carriage 301 has nozzles of respective colors, i.e., black (K), cyan (C), magenta (M), and yellow (Y). The carriage motor 304 connected to the carriage 301 via the belt 303 is configured to apply driving pulses to the inkjet recording head 302 while moving the carriage 301. As a result, printing and recording in a single pass is made on a recording medium 306 (specifically, on a sheet output from the sheet feeding unit 101).

The sensor 305 is provided at a location next to the inkjet recording head 302 on the carriage 301. The sensor 305 is an image detecting device, that is, an image sensor, configured to detect the completion of drawing on a recording medium 306 by the printing unit 118. The CPU 111 is configured to monitor the sensor 305 moving together with the carriage 301 so that, when the sensor 305 detects the completion of drawing on a recording medium 306 by the inkjet recording head 302, the CPU 111 receives a notification to that effect from the printing unit 118. The recording medium 306 is conveyed by a prescribed amount in a direction indicated by an arrow C in FIG. 3 by the conveyor roller 308, which is driven by the conveyor motor 307, each time printing and recording in a single pass is made by the movement of the carriage 301. By repeating this, printing and recording of one sheet on the recording medium 306 is completed.

The recovery mechanism 309, which is located away from a recording medium 306 in the direction indicated by the arrow A in FIG. 3, is provided. for performing a cleaning operation so as to keep the inkjet recording head 302 in good condition. To perform the cleaning operation, the CPU 111 is configured to cause the carriage 301 to move the inkjet recording head 302 to a position facing the recovery mechanism 309 and indicated by a dotted line in FIG. 3, and then drives the recovery mechanism 309. As a result, the inkjet recording head 302 is unclogged, and mixed colors are removed. The recovery mechanism 309 is configured to perform a plurality of cleaning operations such as powerful cleaning, which the ink in the nozzles of the inkjet recording head 302 is powerfully drawn in, as well as a standard cleaning operation.

In a case where printing will not be performed for a long period of time, the CPU 111 causes the carriage 301 to move the inkjet recording head 302 to the position indicated by the dotted line in FIG. 3 and then moves the recovery mechanism 309 in a direction indicated by an arrow D in FIG. 3, causing the recovery mechanism 309 to abut against the inkjet recording head 302. As a result, a nozzle portion of the inkjet recording head 302 is capped with the recovery mechanism 309, which prevents drying and ink solidification. This operation will hereafter be referred to as "the capping operation".

To maintain proper printing quality, the CPU 111 is configured to perform the cleaning and capping operations while controlling the operation of the printer 100. If ink fades or becomes discolored despite the cleaning and capping operations, a user is allowed to designate a maintenance operation via the client terminal 105 or the operation panel 103, causing the CPU 111 to perform the cleaning and capping operations.

Figure 4:
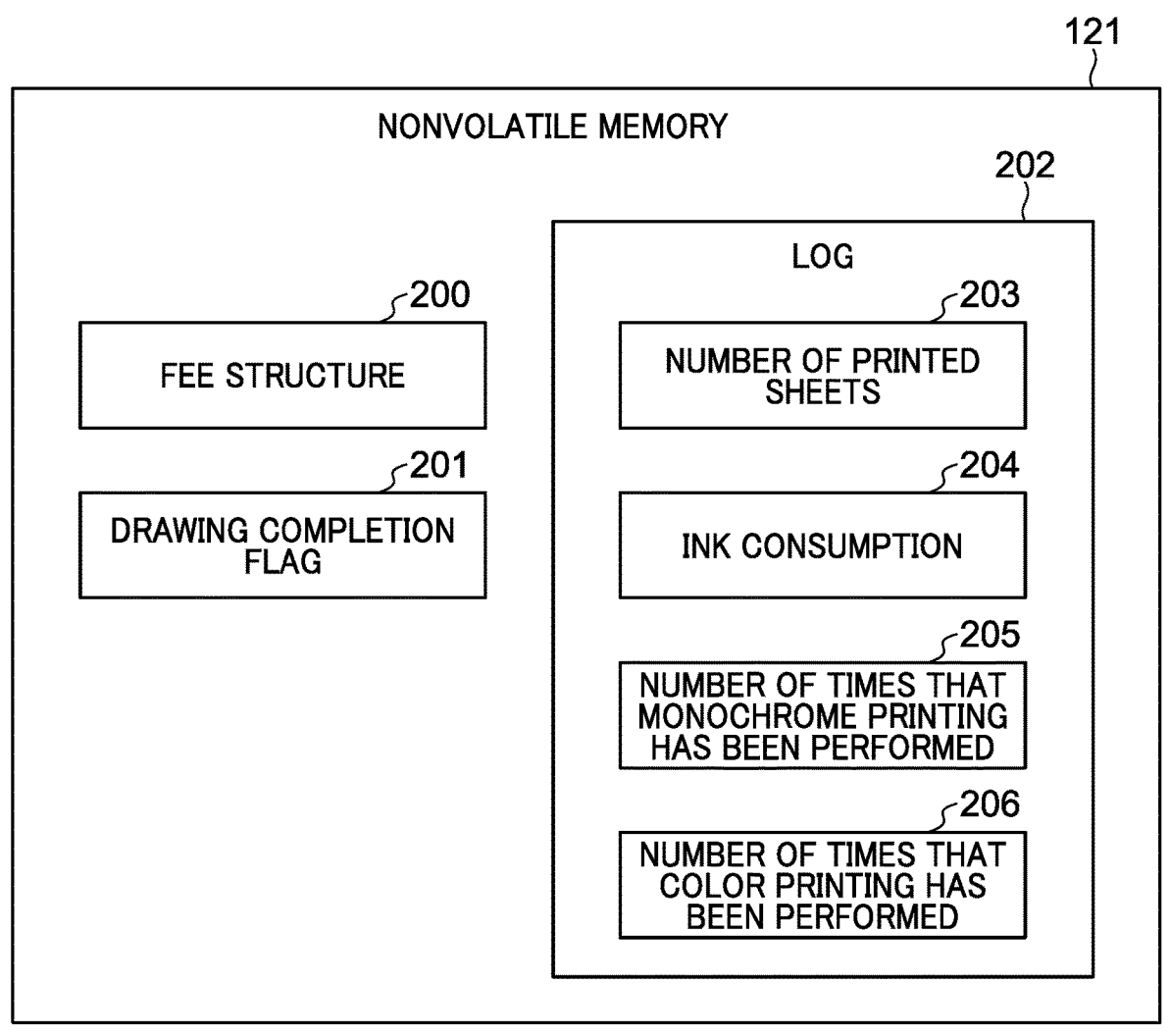
FIG. 4 is a diagram useful in explaining various types of data stored in a nonvolatile memory of the printer in a first embodiment.

FIG. 4 is a diagram useful in explaining various types of data stored in the nonvolatile memory 121 in the first embodiment.

As illustrated in FIG. 4, a fee structure 200, a drawing completion flag 201, and a log 202 are stored in the nonvolatile memory 121. The log 202 corresponds to first information in this disclosure and the drawing completion flag 201 corresponds to second information in this disclosure.

The fee structure 200 is information indicating a method for calculating a usage fee for the printer 100 (how to calculate the usage fee) set in advance. In the present embodiment, information indicating "X yen per sheet" is stored as the fee structure 200 in the nonvolatile memory 121 in advance. The drawing completion flag 201 is a flag indicating whether or not drawing on a sheet by the printing unit 118 has been completed. The log 202 is an operational history of the printer 100 and used to calculate a usage fee for the printer 100. For example, the log 202 includes the number of sheets printed by the printer 100 (the printing unit 118), ink consumption 204, the number of times that monochrome printing has been performed 205, and the number of times that color printing has been performed 206.

It should be noted that the printer 100 may be an MFP equipped with functions such as a copying function in addition to the printing function. In this case, the number of times that each function has been performed (for example, the number of times that the printing function has been performed, and the number of times that the copying function has been performed) is also recorded in the log 202.

Figure 5:
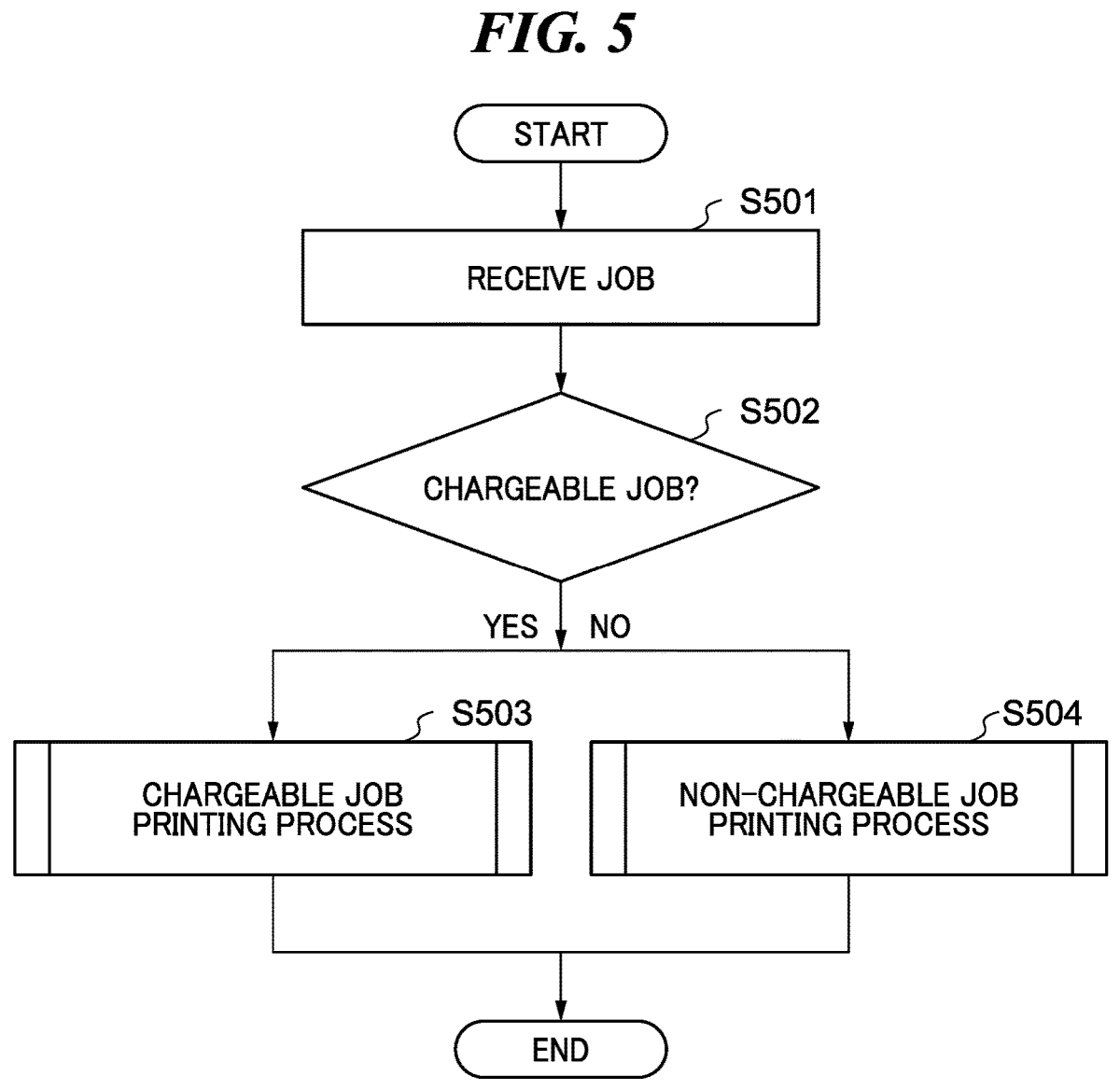

FIG. 5 is a flowchart of a printing process according to the first embodiment, which is carried out in the printer 100. The printing process is started by the CPU 111 executing a program stored in the ROM 113 in response to the transmission of a job from the client terminal 105 to the printer 100.

In step S501, the CPU 111 causes the wireless LAN unit 104 to receive a job transmitted from the client terminal 105 via wireless LAN communication, and the process then proceeds to step S502.

In the step S502, the CPU 111 compares the received job with the fee structure 200 stored in the nonvolatile memory 121, and determines whether the received job is a chargeable job or a non-chargeable job. When it is determined that the received job is a chargeable job (YES in the step S502), the process proceeds to step S503, in which a chargeable job printing process is carried out. On the other hand, when it is determined that the received job is a non-chargeable job (NO in the step S502), the process proceeds to step S504, in which a non-chargeable job printing process is carried out. Here, examples of the chargeable job include a job for which color printing is designated. Examples of the non-chargeable job include a job that causes the cleaning operation described above to be performed, and a job for which monochrome printing free of charge according to the fee structure 200 is designated. It should be noted that detailed description of the step S503 and the step S504 will be given later. The printing process is ended when the process in the step S503 or the step S504 is completed.

Figure 6:
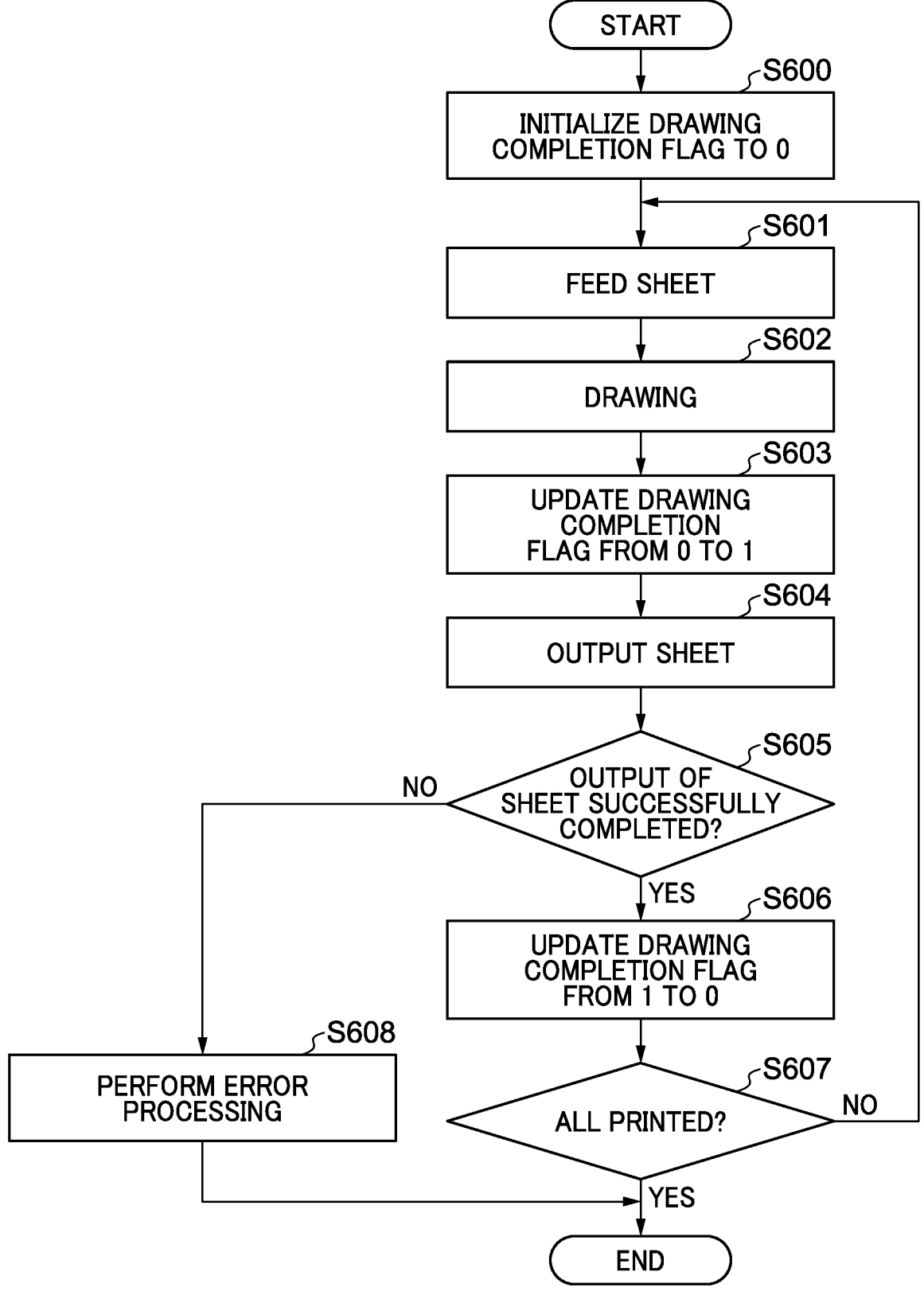
FIG. 6 is a flowchart of a chargeable job printing process in step S503 in FIG. 5.

FIG. 6 is a flowchart of the chargeable job printing process in the step S503 in FIG. 5. The chargeable job printing process is started by the CPU 111 executing a program stored in the ROM 113 in response to the determination that the job received in the step S502 is a chargeable job.

In step S600, the CPU 111 initializes the value of the drawing completion flag 201, which is stored in the nonvolatile memory 121, to zero. Here, the value of zero set for the drawing completion flag 201 indicates that drawing on one sheet has not been completed. It should be noted that the completion of drawing on one sheet means that all of drawing designated for one sheet has been completed. For example, in one-sided printing, the completion of drawing on one sheet means that drawing on one side of one sheet (drawing on one page) has been completed, and in two-sided printing, the completion of drawing on one sheet means that drawing on both sides of one sheet (drawing on two pages) has been completed.

In step S601, the CPU 111 instructs the sheet feeding unit control circuit 117 to feed a sheet, causing the sheet to be fed from the sheet feeding unit 101 and conveyed to the printing unit 118.

In step S602, the CPU 111 instructs the printing unit 118 to perform drawing, and in accordance with the instruction, the printing unit 118 performs drawing on the sheet conveyed to the printing unit 118 in the step S601. While the drawing is being performed, the CPU 111 monitors the sensor 305 of the printing unit 118 to determine whether or not drawing on one sheet has been completed. When the CPU 111 determines that drawing on one sheet has been completed, the process proceeds to step S603.

In the step S603, the CPU 111 updates the value of the drawing completion flag 201, which is stored in the non-volatile memory 121, from zero to one (first updating process). Here, the value of one set for the drawing completion flag 201 means that drawing on one sheet has been completed, that is, the drawing completion flag 201 is ON (a first state indicating completion of the drawing on one sheet). On the other hand, the value of zero set for the drawing completion flag 201 means that the drawing completion flag 201 is OFF (a second state which is different from the first state).

In step S604, the CPU 111 controls the sheet output unit control circuit 119 to take in one sheet on which drawing has been completed from the printing unit 118, feed the sheet to the sheet output unit 102, and start outputting the sheet. The CPU 111 also starts monitoring the sheet output sensor 120 of the sheet output unit 102 (first output starting process).

In step S605, based on a result obtained by monitoring the sheet output sensor 120, the CPU 111 determines whether the sheet output has been successfully completed or an error occurred during the sheet output. Detailed description of how to make this determination will be given later with reference to FIG. 9.

When the CPU 111 determines that the sheet output has been successfully completed (YES in the step S605), the process proceeds to step S606. When the CPU 111 determines that an error occurred during the sheet output (NO in the step S605), the process proceeds to step S608.

In the step S606, the CPU 111 updates the value of the drawing completion flag 201 and the value of the number of printed sheets 203 stored in the nonvolatile memory 121 (second updating process). Specifically, the CPU 111 updates the value of the drawing completion flag 201 from one to zero and increments the value of the number of printed sheets 203 by one.

In step S607, the CPU 111 determines whether or not printing for the number of sheets designated in the job has been completed. Specifically, when the value of the number of printed sheets 203 and the number of sheets designated in the job are equal, it is determined that printing for the number of sheets designated in the job has been completed. When the CPU 111 determines that printing for the number of sheets designated in the job has been completed (YES in the step S607), the present process is ended. When the CPU 111 determines that printing for the number of sheets designated in the job has not been completed (NO in the step S607), the process returns to the step S601, in which the next sheet is fed.

In the step S608, the CPU 111 terminates the job by performing error processing on the error that occurred in the printer 100 during the sheet output in the step S604, and then ends the present process (job termination process). At this time, the CPU 111 does not update the value of the drawing completion flag 201 and the value of the number of printed sheets 203 as distinct from the step S606, so that in the case where an error occurs during the output of a sheet, the CPU 111 does not count this sheet as a printed sheet even if drawing has been completed on the sheet. Thus, when an error that is not the user's fault occurs during sheet output in the printer 100, the user is not billed (charged) for the cost of printing the sheet being output as a usage fee.

Figure 7:
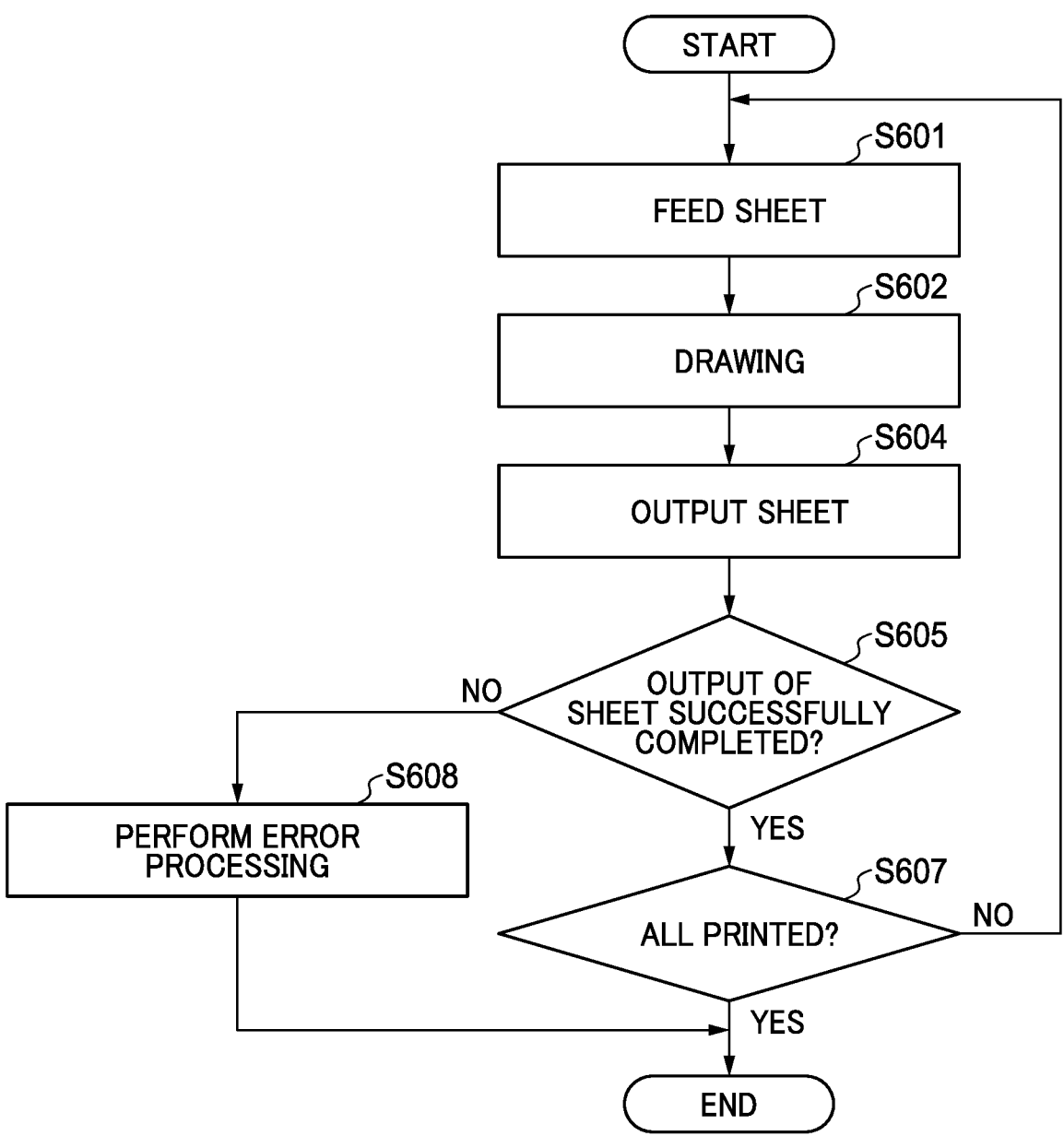
FIG. 7 is a flowchart of a non-chargeable job printing process in step S504 in FIG. 5.

FIG. 7 is a flowchart of the non-chargeable printing process in the step S504 in FIG. 5. The non-chargeable printing process is started by the CPU 111 executing a program stored in the ROM 113 in response to the determination that the job received in the step S502 is a non-chargeable job. It should be noted that in FIG. 7, the same steps as those in the flowchart of FIG. 6 are designated by the same reference numerals.

In step S601, the CPU 111 instructs the sheet feeding unit control circuit 117 to feed a sheet, causing the sheet to be fed from the sheet feeding unit 101 and conveyed to the printing unit 118.

In step S602, the CPU 111 instructs the printing unit 118 to perform drawing, and in accordance with the instruction, the printing unit 118 performs drawing for one page on the sheet conveyed to the printing unit 118 in the step S601. While the drawing is being performed, the CPU 111 monitors the sensor 305 of the printing unit 118 to determine whether or not drawing on one sheet has been completed. When the CPU 111 determines that drawing on one sheet has been completed, the process proceeds to step S604.

In the step S604, the CPU 111 controls the sheet output unit control circuit 119 to take in one sheet on which drawing has been completed from the printing unit 118, feed the sheet to the sheet output unit 102, and output the sheet. After that, the CPU 111 starts monitoring the sheet output sensor 120 of the sheet output unit 102.

In step S605, based on a result obtained by monitoring the sheet output sensor 120, the CPU 111 determines whether sheet output has been successfully completed or an error occurred during the sheet output.

When the CPU 111 determines that the sheet output has been successfully completed (YES in the step S605), the process proceeds to step S607. When the CPU 111 determines that an error occurred during the sheet output (NO in the step S605), the process proceeds to step S608.

In the step S607, the CPU 111 determines whether or not printing for the number of sheets designated in the job has been completed. When the CPU 111 determines that printing for the number of sheets designated in the job has been completed (YES in the step S607), the present process is ended. On the other hand, when the CPU 111 determines that printing for the number of sheets designated in the job has not been completed (NO in the step S607), the process returns to the step S601, in which the next sheet is fed.

In the step S608, the CPU 111 performs error processing on the error that occurred during the sheet output in the step S604, and then ends the flow of the present process.

As described above, in the non-chargeable job printing process, there is no need to record a log for use in calculating a usage fee as distinct from the chargeable job printing process, which avoids processing on the nonvolatile memory 121.

Figure 8:
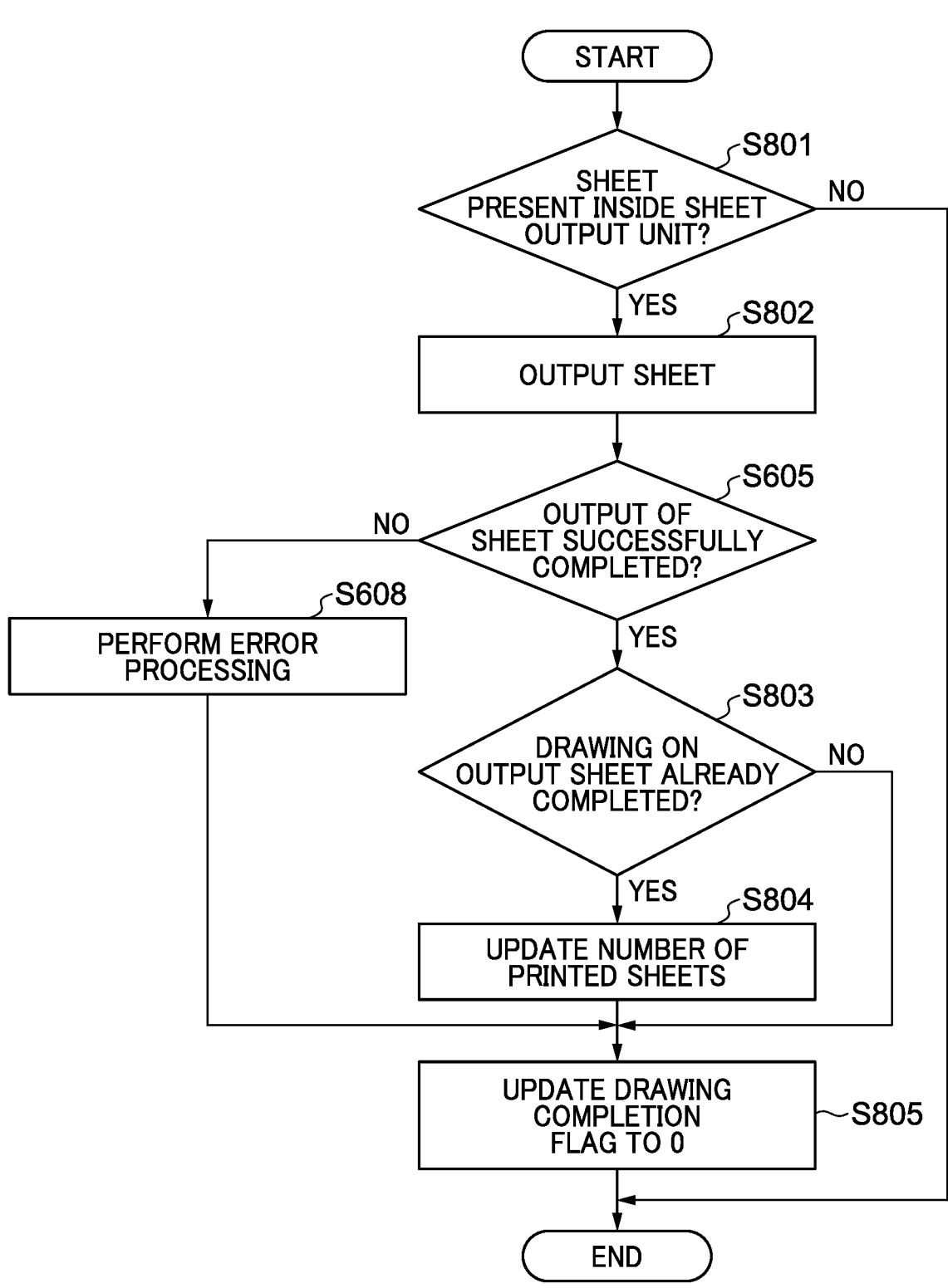

FIG. 8 is a flowchart of a number-of-printed-sheets updating process according to the first embodiment, which is carried out in the printer 100 at power-on. The number-of-printed-sheets updating process is started by the CPU 111 executing a program stored in the ROM 113 in response to the turning-on of the power to the printer 100 from the AC commercial power supply 123 through the power supply unit 122.

In step S801, the CPU 111 obtains, from the sheet output unit 102, a result of detection by the sheet output sensor 120, whether or not any sheet to be output is present inside the sheet output unit 102. When the obtained result of detection indicates that there is no sheet in the sheet output unit 102 (NO in the step S801), the present process is ended. On the other hand, when the obtained result of detection indicates that there is a sheet in the sheet output unit 102 (YES in the step S801), it is determined that a sheet to be output remains in the sheet output unit 102, and the process proceeds to step S802.

In the step S802, the CPU 111 controls the sheet output unit control circuit 119 to start outputting the sheet remaining in the sheet output unit 102. The CPU 111 also starts monitoring the sheet output sensor 120 of the sheet output unit 102 and lets the process to proceed to step S605 (second output starting process).

In the step S605, based on a result obtained by monitoring the sheet output sensor 120, the CPU 111 determines whether the sheet output has been successfully completed or an error occurred during the sheet output. When the CPU 111 determines that the sheet output has been successfully completed (YES in the step S605), the process proceeds to step S803. When the CPU 111 determines that an error occurred during the sheet output (NO in the step S605), the process proceeds to the step S608.

In the step S803, the CPU 111 reads the value (the state) of the drawing completion flag 201 from the nonvolatile memory 121, refers to the read value, and determines whether or not drawing on the output sheet has already been completed.

When the read value (the state) of the drawing completion flag 201 is one (the first state) and the CPU 111 determines that drawing on the output sheet has already been completed (YES in the step S803), the process proceeds to step S804. In the step S804, the CPU 111 updates the value of the number of printed sheets 203 stored in the nonvolatile memory 121, and more specifically, increments the value of the number of printed sheets 203 by one (third updating process). The process then proceeds to step S805. Thus, even if an error occurs while a sheet is being output, this sheet is counted as a printed sheet as long as after that, the printer 100 is powered on, and the sheet on which drawing has been completed is successfully output.

On the other hand, when the read value of the drawing completion flag 201 is zero (the second state) and the CPU 111 determines that drawing on the output sheet has not been completed (NO in the step S803), the process proceeds to step S805 without the processing in the step S804 being performed. Here, examples of the case where drawing has not been completed include a case where the printer 100 is powered off while drawing on a sheet is in progress, and when the printer 100 is powered on, the sheet output unit 102 takes in the sheet on which the drawing was suspended. Thus, even if a sheet is successfully output when the printer 100 is powered on, the CPU 111 does not count the sheet as a printed sheet if drawing on the sheet has not been completed (third updating process). This prevents a user from being billed (charged) for the cost of printing a sheet on which drawing has not been completed as a usage fee.

In the step S804, the CPU 111 updates the value of the number of printed sheets 203 stored in the nonvolatile memory 121. Specifically, the CPU 111 increments the value of the number of printed sheets 203 by one.

In step S608, the CPU 111 performs error processing on the error that occurred in the printer 100 during the sheet output in the step S802, and then the process proceeds to the step S805. That is, in the first embodiment, in a case where an error occurs while a sheet is being output, the CPU 111 does not count the sheet being output as a printed sheet. As a result, when an error that is not a user's fault occurs while a sheet is being output, the user is not billed (charged) for the cost of printing the sheet being output as a usage fee.

In the step S805, the CPU 111 updates the value of the drawing completion flag 201 stored in the nonvolatile memory 121 to zero and ends the present process.

Figure 9:
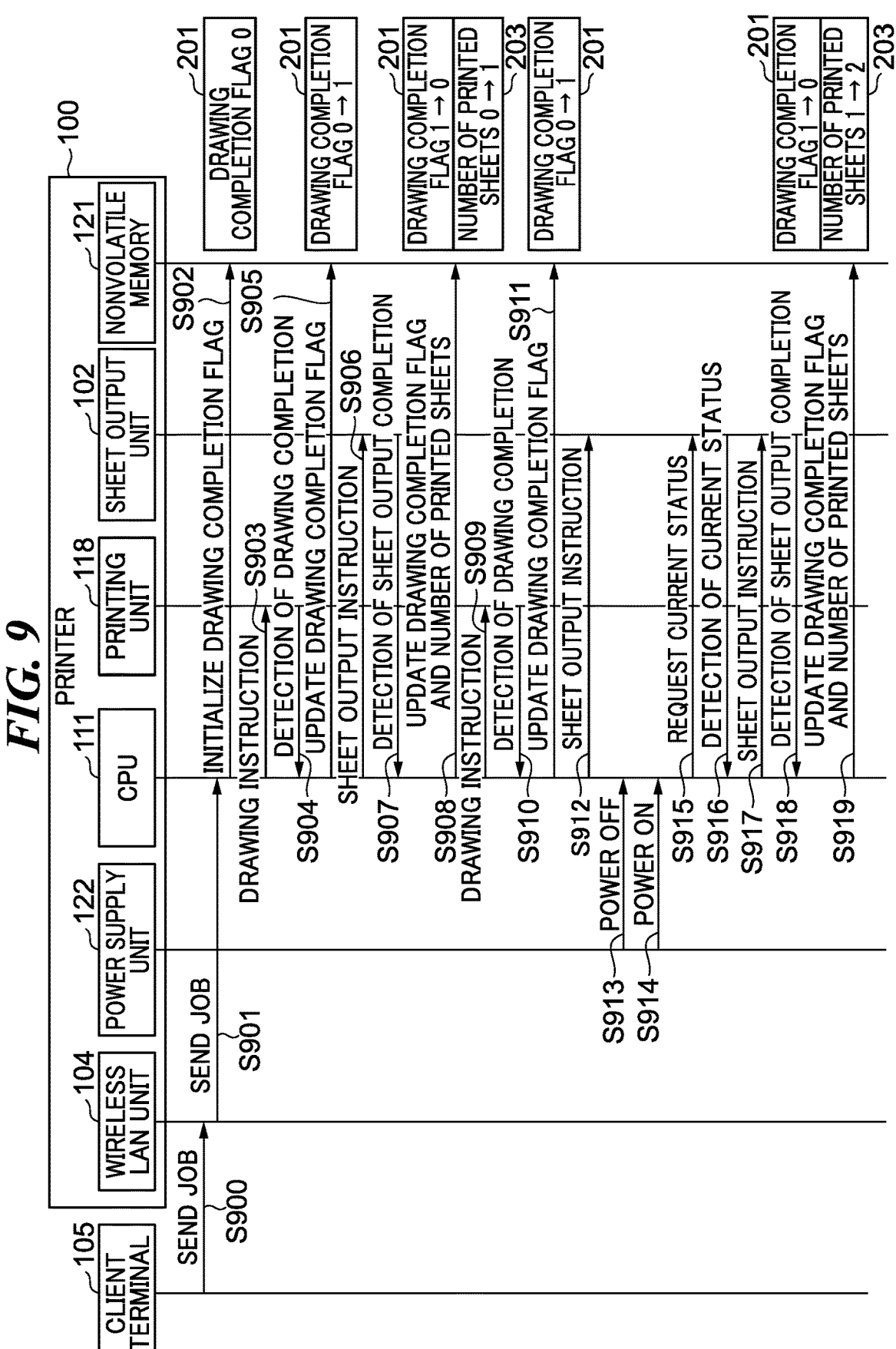
FIG. 9 is a sequence diagram illustrating an example of an operation of the image processing system in the first embodiment.

FIG. 9 is a sequence diagram illustrating an example of an operation of the image processing system 1 in the first embodiment. This sequence corresponds to the situation such that, in the execution of a chargeable job for two or more sheets, the printer 100 is powered off while a second sheet is being output. This sequence is started with the printer 100 powered on.

In step S900, the client terminal 105 sends a job to the wireless LAN unit 104 of the printer 100 via wireless LAN communication.

In step S901, the wireless LAN unit 104 sends the job received from the client terminal 105 to the CPU 111. The CPU 111 compares the received job with the fee structure 200 stored in the nonvolatile memory 121, and determines that the received job is a chargeable job.

In step S902, the CPU 111 initializes the value of the drawing completion flag 201 stored in the nonvolatile memory 121 to zero.

In step S903, the CPU 111 instructs the printing unit 118 to perform drawing on the first sheet. In accordance with the received instruction, the printing unit 118 performs drawing on the first sheet after the first sheet is fed from the sheet feeding unit 101.

In step S904, the CPU 111 receives a notification that the sensor 305 has detected the completion of drawing on the sheet from the printing unit 118.

In step S905, the CPU 111 updates the value of the drawing completion flag 201 stored in the nonvolatile memory 121 from zero to one.

In step S906, the CPU 111 controls the sheet output unit control circuit 119 to instruct the sheet output unit 102 to output the first sheet. At this time, the CPU 111 starts monitoring the sensor 305.

In step S907, the CPU 111 receives a notification that the sheet output sensor 120 being monitored no longer detects any sheet (notification of the detection of sheet output completion) from the sheet output unit 102. At this time, the CPU 111 determines that the output of the first sheet has been successfully completed.

In step S908, the CPU 111 updates the value of the drawing completion flag 201 and the value of the number of printed sheets 203 stored in the nonvolatile memory 121. Specifically, the CPU 111 updates the value of the drawing completion flag 201 from one to zero and updates the number of printed sheets 203 from zero, which is the number of printed sheets before the execution of the job, to one. Since the job is comprised of a plurality of sheets, the CPU 111 determines that there is still printing that needs to be performed.

In step S909, the CPU 111 instructs the printing unit 118 to perform drawing on the second sheet. In accordance with the received instruction, the printing unit 118 performs drawing on the second sheet after the second sheet is fed from the sheet feeding unit 101.

In step S910, the CPU 111 receives a notification that the sensor 305 has detected the completion of drawing on the sheet from the printing unit 118.

In step S911, the CPU 111 updates the value of the drawing completion flag 201 stored in the nonvolatile memory 121 from zero to one.

In step S912, the CPU 111 controls the sheet output unit control circuit 119 to instruct the sheet output unit 102 to output the second sheet. At this time, the CPU 111 starts monitoring the sensor 305.

In step S913, before receiving the notification indicating the completion of sheet output from the sheet output unit 102, that is, while the sheet output sensor 120 being monitored is detecting the sheet, the CPU 111 receives a notification that the printer 100 has been powered off from the power supply unit 122. In this case, based on the received notification, the CPU 111 determines that an error occurred while the second sheet was being output. As a result, the CPU 111 performs error processing in which it causes the sheet output unit 102 to suspend sheet output and terminates the job being executed.

In step S914, the CPU 111 receives a notification that the printer 100 has been powered on from the power supply unit 122.

In step S915, the CPU 111 controls the sheet output unit control circuit 119 to request the sheet output unit 102 to provide notification about the current sheet output status.

In step S916, when the sheet output sensor 120 detects the presence of a sheet inside the sheet output unit 102, the sheet output unit 102 notifies the CPU 111 of the detection result as the current sheet output status. Based on this notification, the CPU 111 determines that the sheet being output still remains inside the sheet output unit 102.

In step S917, the CPU 111 controls the sheet output unit control circuit 119 to issue an instruction to output the sheet remaining inside the sheet output unit 102. At this time, the CPU 111 starts monitoring the sensor 305.

In step S918, the CPU 111 receives a notification that the sheet output sensor 120 being monitored no longer detects any sheet (notification of the detection of sheet output completion) from the sheet output unit 102. At this time, the CPU 111 determines that the output of the sheet remaining inside the sheet output unit 102 has been successfully completed.

In step S919, the CPU 111 updates the values of the drawing completion flag 201 and the number of printed sheets 203 stored in the nonvolatile memory 121. Specifically, the CPU 111 updates the value of the drawing completion flag 201 from one to zero and updates the value of the number of printed sheets 203 from 1 to 2 by adding the number of the sheet output after the turning-on of the printer 100 to the value of the number of printed sheets 203. The same processing is performed until the number of sheets designated in the job and the value of the number of printed sheets 203 become equal, and then the present process is ended.

Thus, in the first embodiment, the CPU 111 performs the control described below. When the sensor 305 detects the completion of drawing on a recording medium by the printing unit 118 while a chargeable job is being executed, the CPU 111 updates the drawing completion flag 201, which corresponds to the second information, to the first state, which indicates ON (first updating process). The CPU 111 then instructs the sheet output unit 102 to output this recording medium and also starts monitoring the sheet output sensor 120 (first output starting process). When the sheet output sensor 120 being monitored no longer detects the recording medium after the sheet output unit 102 is instructed to output the recording medium in the first output starting process, the CPU 111 updates the drawing completion flag 201 to the second state, which indicates OFF, and updates the log 202, which corresponds to the first information (second updating process). When an error occurs in the printer 100 while the sheet output sensor 120 being monitored is detecting the recording medium after the sheet output unit 102 is instructed to output the recording medium in the first output starting process, the CPU 111 terminates the chargeable job without updating the log 202.

Moreover, in the number-of-printed sheets updating process (FIG. 8) that is carried out in the printer 100 at power-on, the CPU 111 reads the state of the drawing completion flag 201 from the nonvolatile memory 121 after a recording medium is output from the sheet output unit 102. When the read state of the drawing completion flag 201 is the second state, the CPU 111 updates the drawing completion flag 201 to the second state without updating the log 202, and when the read state of the drawing completion flag 201 is the first state, the CPU 111 updates the log 202 and then updates the drawing completion flag 201 to the second state (third updating process).

By controlling the printer 100 as the image forming apparatus as described above, for execution of a non-chargeable job, an adverse influence of speed limitations on a low-speed nonvolatile memory can be reduced, and for execution of a chargeable job, the number of printed sheets on which drawing has been completed can be recorded or updated each time such a sheet is output. As a result, even if the supply of power to the printer is stopped during the output of a sheet on which drawing has been completed or an error that is not a user's fault occurs during sheet output, a log for use in calculating a usage fee can be accurately stored.

Second Embodiment

In the first embodiment described above, when a chargeable job is executed, control is performed to count the number of printed sheets each time a sheet is output.

On the other hand, in a second embodiment, in a case where the number of times that the printer 100 was powered off in the previous sheet output processes is smaller than a predetermined number of times when a chargeable job is executed in the printer 100, the above-mentioned control is switched to control to count the number of printed sheets at the end of the chargeable job (shift the time to update the number of printed sheets 203 stored in the nonvolatile memory 121 to the end of the chargeable job). In the following description, the same features and steps as those in the first embodiment are for example, designated by same reference symbols, description of which is omitted. The following description focuses on differences from the first embodiment.

Figure 10:
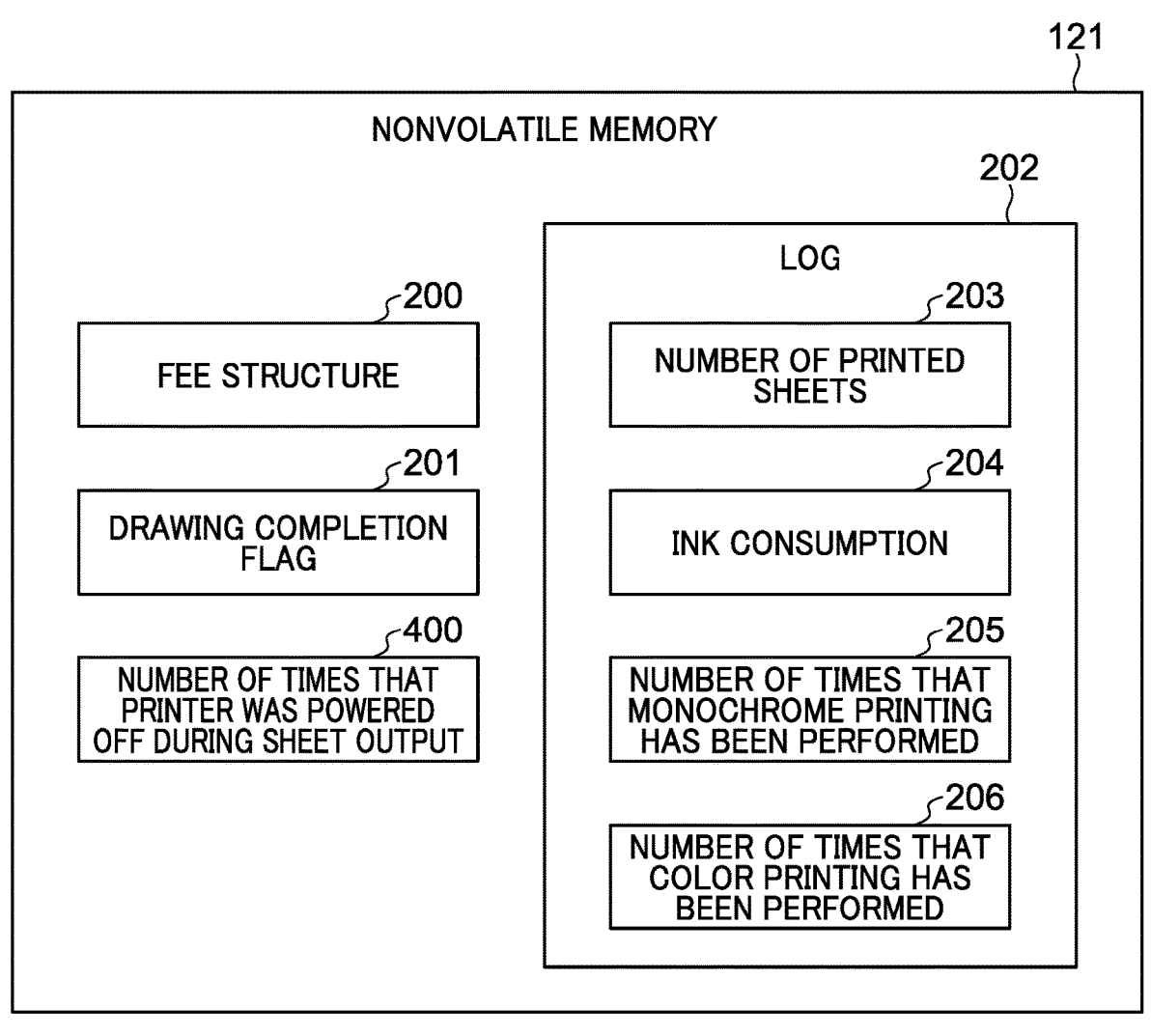
FIG. 10 is a diagram useful in explaining various types of data stored in a nonvolatile memory of a printer in a second embodiment.

FIG. 10 is a diagram useful in explaining various types of data stored in the nonvolatile memory 121 in the second embodiment.

As illustrated in FIG. 10, a fee structure 200, a drawing completion flag 201, a log 202, and the number of times that the printer was powered off during sheet output 400 are stored in the nonvolatile memory 121.

The fee structure 200 is information for calculating a usage fee for the printer 100, and for example, information such as "X yen per sheet" and "monochrome printing is free of charge" is stored as the fee structure 200. The drawing completion flag 201 is a flag indicating whether or not drawing on a sheet by the printing unit 118 has been completed. The log 202 is an operational history of the printer 100. For example, the log 202 includes the number of sheets printed by the printer 100 (the printing unit 118), ink consumption 204, the number of times that monochrome printing has been performed 205, and the number of times that color printing has been performed 206.

The number of times that the printer was powered off during sheet output 400 indicates the number of times that the printer 100 was powered off during output of sheets on which drawing has been completed.

Figure 11:
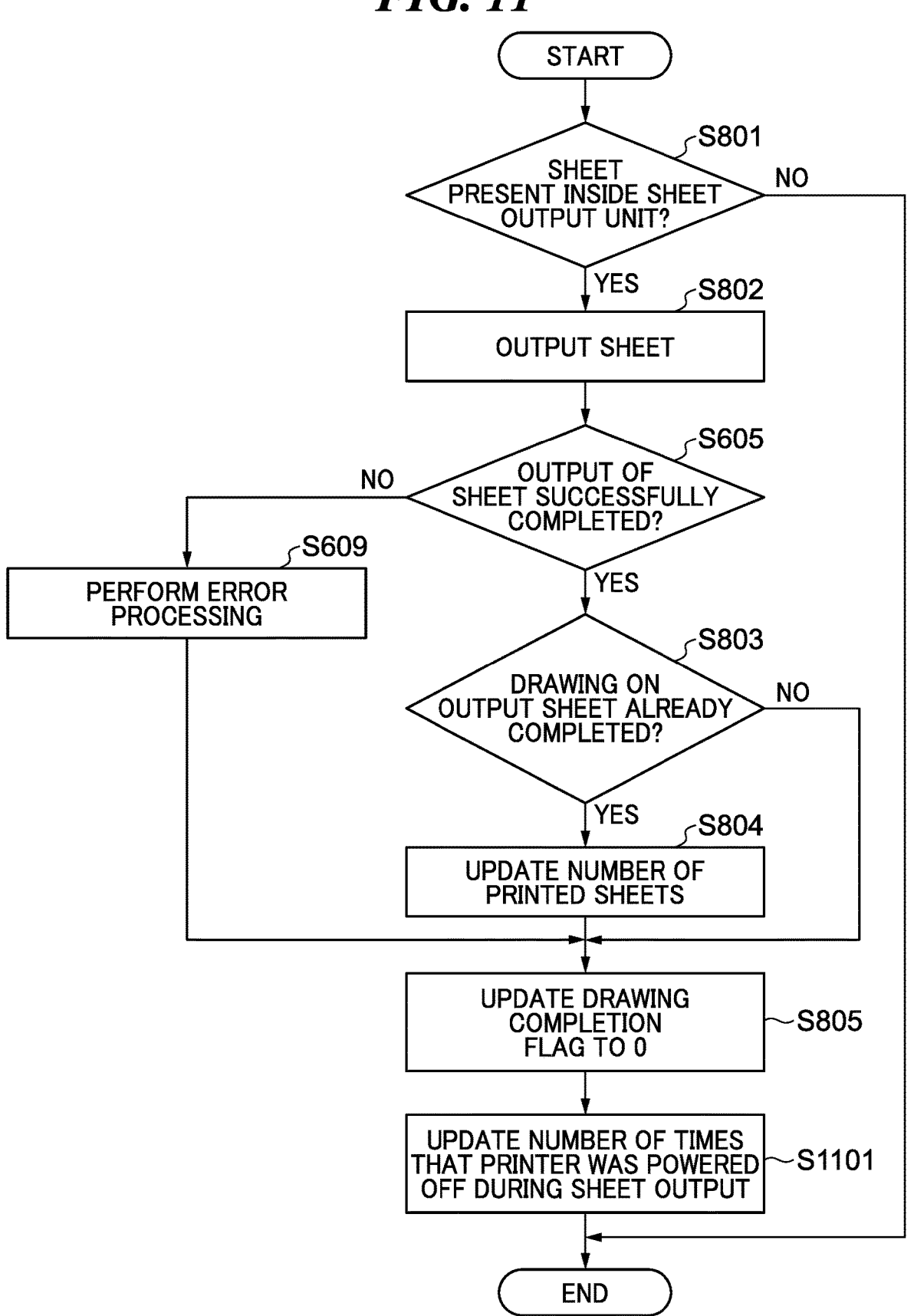

FIG. 11 is a flowchart of a number-of-printed-sheets updating process according to the second embodiment, which is carried out in the printer 100 at power-on. The number-of-printed-sheets updating process is started by the CPU 111 executing a program stored in the ROM 113 in response to the turning-on of the power to the printer 100 from the AC commercial power supply 123 through the power supply unit 122.

In step S801, the CPU 111 obtains, from the sheet output unit 102, a result of detection by the sheet output sensor 120, and based on the obtained result of detection, determines whether or not there is a sheet inside the sheet output unit 102. When the CPU 111 determines that the obtained result of detection indicates that there is no sheet in the sheet output unit 102 (NO in the step S801), the present process is ended. On the other hand, when the CPU 111 determines that there is a sheet in the sheet output unit 102 (YES in the step S801), the process proceeds to step S802.

In the step S802, the CPU 111 controls the sheet output unit control circuit 119 to start outputting the sheet inside the sheet output unit 102. The CPU 111 also starts monitoring the sheet output sensor 120 of the sheet output unit 102 and lets the process to proceed to step S605.

In step S605, based on a result of detection by the sheet output sensor 120 being monitored, the CPU 111 determines whether the sheet output has been successfully completed or an error occurred during the sheet output. When the CPU 111 determines that the sheet output has been successfully completed (YES in the step S605), the process proceeds to step S803. When the CPU 111 determines that an error occurred during the sheet output (NO in the step S605), the process proceeds to step S609.

In the step S803, the CPU 111 refers to the value (the state) of the drawing completion flag 201 stored in the nonvolatile memory 121 to determine whether or not drawing on the output sheet has already been completed.

When the read value (the state) of the drawing completion flag 201 is one (the first state) and the CPU 111 determines that drawing on the output sheet has already been completed (YES in the step S803), the process proceeds to step S804. In the step S804, the CPU 111 updates the value of the number of printed sheets 203 stored in the nonvolatile memory 121, and more specifically, increments the value of the number of printed sheets 203 by one. The process then proceeds to step S805. Thus, even if an error occurs while a sheet is being output, the CPU 111 counts this sheet as a printed sheet as long as after that, the printer 100 is powered on, and the sheet on which drawing has been completed is successfully output.

On the other hand, when the read value of the drawing completion flag 201 is zero (the second state) and the CPU 111 determines that drawing on the output sheet has not been completed (NO in the step S803), the process proceeds to the step S805 without the processing in the step S804 being performed. Here, examples of the case where drawing has not been completed include a case where the printer 100 is powered off while drawing on a sheet is in progress, and when the printer 100 is powered on, the sheet output unit 102 takes in the sheet on which the drawing was suspended. Thus, even if a sheet is successfully output when the printer 100 is powered on, the CPU 111 does not count the sheet as a printed sheet if drawing on the sheet has not been completed. This prevents a user from being billed (charged) for the cost of printing a sheet on which drawing has not been completed as a usage fee.

In the step S804, the CPU 111 updates the value of the number of printed sheets 203 stored in the nonvolatile memory 121. Specifically, the CPU 111 increments the value of the number of printed sheets 203 by one.

In the step S609, the CPU 111 performs error processing on the error that occurred in the printer 100 during the sheet output in the step S802, and then the process proceeds to the step S805. That is, in the second embodiment, in a case where an error occurs while a sheet is being output, the CPU 111 does not count the sheet being output as a printed sheet as is the case with the first embodiment. As a result, when an error that is not a user's fault occurs while a sheet is being output, the user is not billed (charged) the cost of printing the sheet being output as a usage fee.

In the step S805, the CPU 111 updates the value of the drawing completion flag 201 stored in the nonvolatile memory 121 to zero.

In step S1101, the CPU 111 increments by one the number of times that the printer was powered off during sheet output 400 stored in the nonvolatile memory 121 and then ends the present process.

Figure 12:
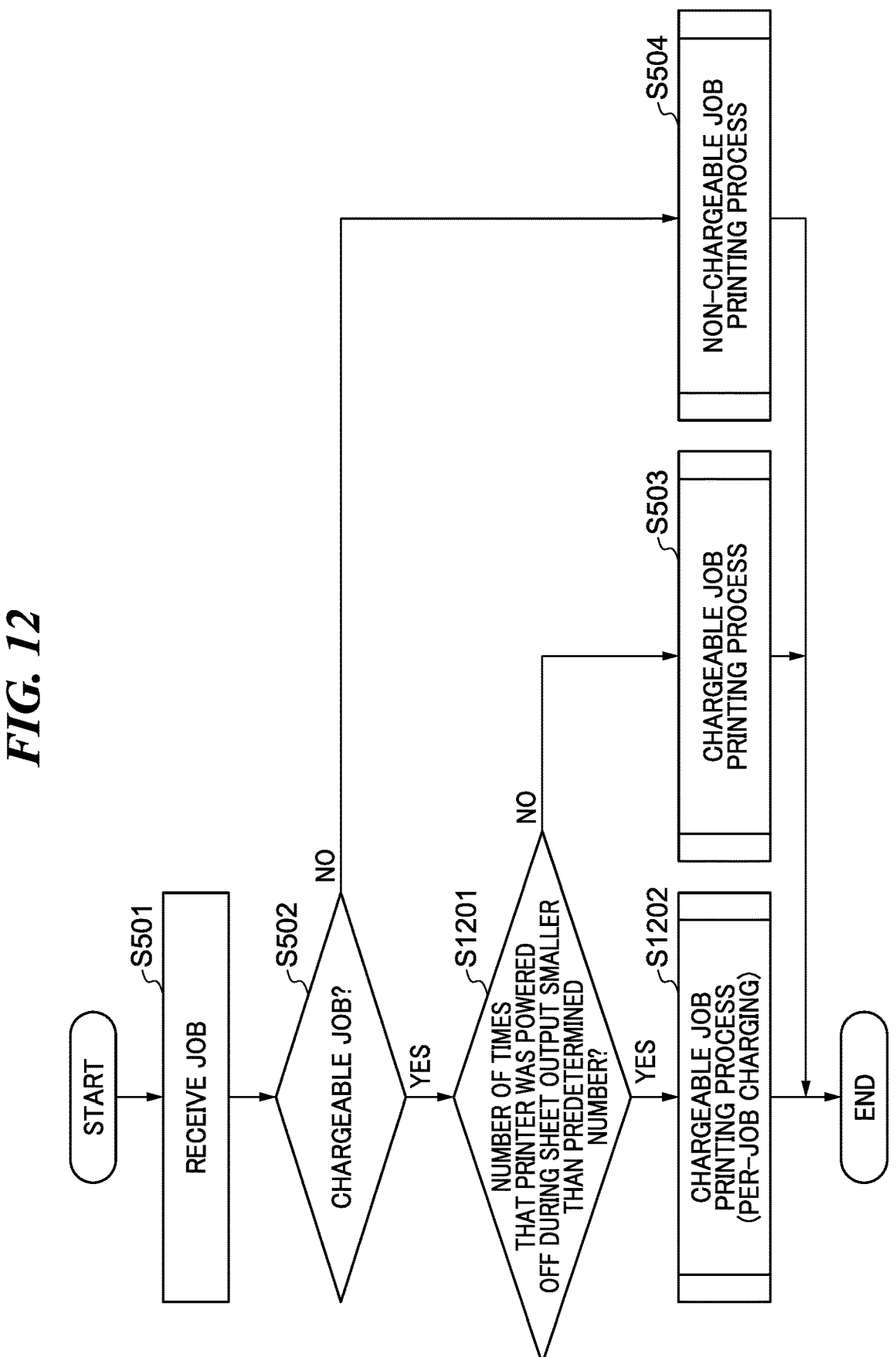
FIG. 12 is a flowchart of a printing process according to the second embodiment, which is carried out in the printer.

FIG. 12 is a flowchart of a printing process according to the second embodiment, which is carried out in the printer 100. The printing process is started by the CPU 111 executing a program stored in the ROM 113 in response to the transmission of a job from the client terminal 105 to the printer 100.

In step S501, the CPU 111 causes the wireless LAN unit 104 to receive a job transmitted from the client terminal 105 via wireless LAN communication, and the process then proceeds to step S502.

In the step S502, the CPU 111 compares the received job with the fee structure 200 stored in the nonvolatile memory 121, and determines whether the received job is a chargeable job or a non-chargeable job. When it is determined that the received job is a chargeable job (YES in the step S502), the process proceeds to step S1201. On the other hand, when it is determined that the received job is a non-chargeable job (NO in the step S502), the process proceeds to step S504, in which a non-chargeable job printing process is carried out.

In the step S1201, the CPU 111 refers to the number of times that the printer was powered off during sheet output 400 stored in the nonvolatile memory 121 and determines whether or not the number of times that the printer was powered off during sheet output 400 is smaller than a predetermined number n. The predetermined number n. is a natural number chosen as desired in advance. When it is determined that the number of times that the printer was powered off during sheet output 400 is smaller than the predetermined number n (YES in the step S1201), the process proceeds to step S1202, in which a chargeable job printing process (per-job charging) is carried out. When it is determined that the number of times that the printer was powered off during sheet output 400 is equal to or greater than the predetermined number n (NO in the step S1201), the process proceeds to step S503, in which a chargeable job printing process (per-sheet charging) is carried out. It should be noted that the processes in the step S503 and S504 are the same as the processes in the first embodiment described above. Detailed description of the chargeable job printing process (per-job charging) in the step S1202 will be given later with reference to FIG. 13. The present process is ended when the process in the step S503, the step S504, or the step S1202 is completed.

Figure 13:
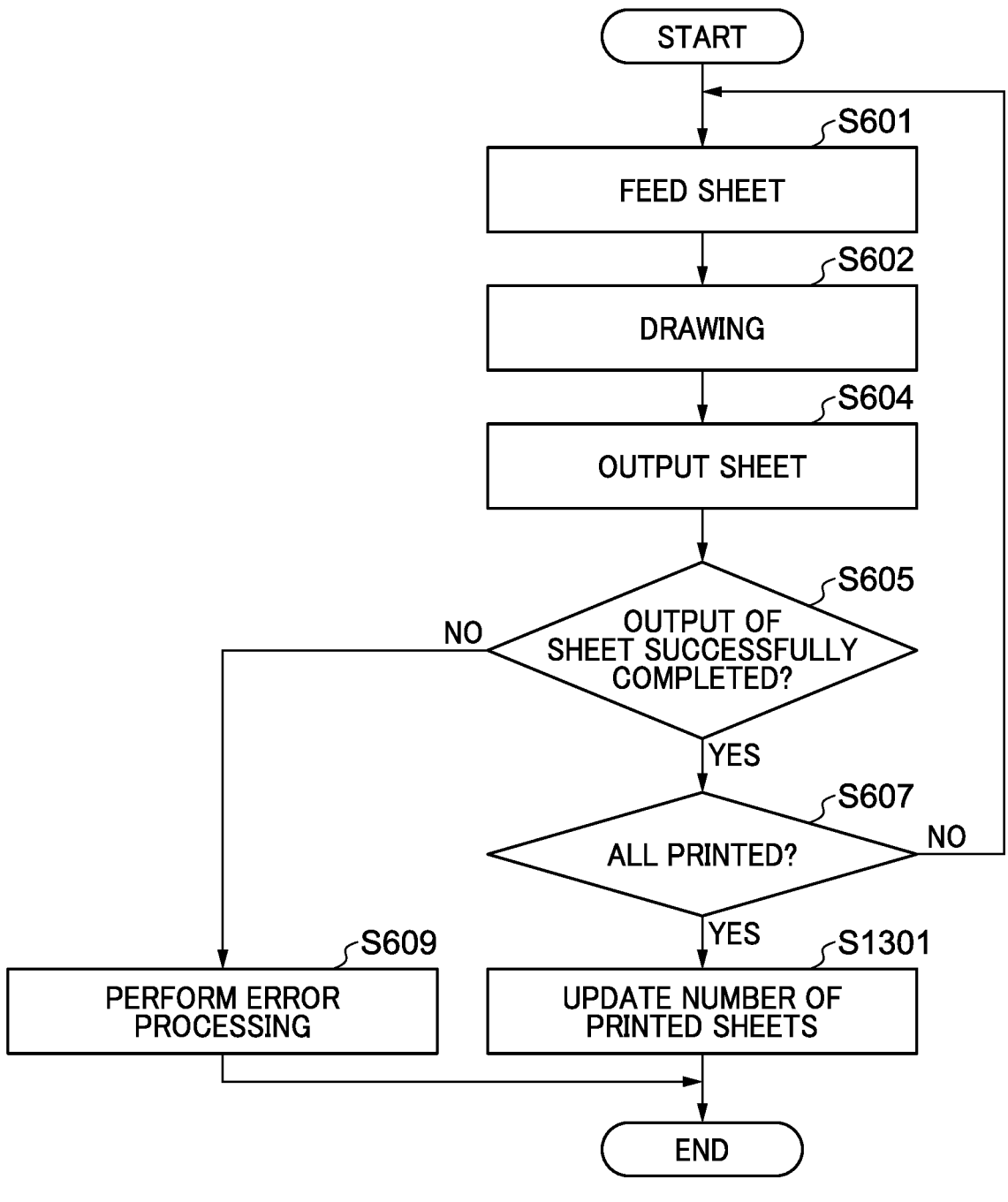
FIG. 13 is a flowchart of a chargeable job printing process (per-job charging) in step S1202 in FIG. 12.

FIG. 13 is a flowchart of the chargeable job printing process (per-job charging) in the step S51202 in FIG. 12. This chargeable job printing process is started by the CPU 111 executing a program stored in the ROM 113 in response to the determination in the step S1201 that the number of times that the printer was powered off during sheet output 400 is smaller than the predetermined number n.

In step S601, the CPU 111 instructs the sheet feeding unit control circuit 117 to feed a sheet, causing the sheet to be fed from the sheet feeding unit 101 and conveyed to the printing unit 118.

In step S602, the CPU 111 instructs the printing unit 118 to perform drawing, and in accordance with the instruction, the printing unit 118 performs drawing on the conveyed sheet. While the drawing is being performed, the CPU 111 monitors the sensor 305 of the printing unit 118 to determine whether or not drawing on one sheet has been completed. When the printing unit 118 determines that drawing on one sheet has been completed, the process proceeds to step S604.

In the step S604, the CPU 111 controls the sheet output unit control circuit 119 to take in one sheet on which drawing has been completed from the printing unit 118, feed the sheet to the sheet output unit 102, and start outputting the sheet. The CPU 111 also starts monitoring the sheet output sensor 120 of the sheet output unit 102.

In step S605, based on a result obtained by monitoring the sheet output sensor 120, the CPU 111 determines whether the sheet output has been successfully completed or an error occurred during sheet output.

When the CPU 111 determines that the sheet output has been successfully completed (YES in the step S605), the CPU 111 stores the number of printed sheets in the RAM 114, followed by the process proceeding to step S607. When the CPU 111 determines that an error has occurred during the sheet output (NO in the step S605), the process proceeds to step S609.

In the step S607, the CPU 111 refers to the number of printed sheets stored in the RAM 114 to determine whether or not printing for the number of sheets designated in the job has been completed. When the CPU 111 determines that printing for the number of sheets designated in the job has been completed (YES in the step S607), the process proceeds to step S1301. When the CPU 111 determines that printing for the number of sheets designated in the job has not been completed (NO in the step S607), the process returns to the step S601, in which the next sheet is fed.

In the step S1301, the CPU 111 adds the number of sheets printed in the present job (the number of printed sheets stored in the RAM 114) to the value of the number of printed sheets 203 stored in the nonvolatile memory 121. After that, the CPU 111 ends the present process.

In step S609, the CPU 111 performs error processing on the error that occurred during sheet output in the step S604 and ends the present process.

As described above, in the second embodiment, in a case where the CPU 111 updates the drawing completion flag 201, which corresponds to the second information, to the second state in the number-of-printed-sheets updating process (FIG. 11) that is carried out in the printer 100 at power-on (the third updating process), the CPU 111 increases by one the number of times that the printer was powered off during sheet output 400. Moreover, in a case where the CPU 111 updates the log 202, which corresponds to the first information, during the execution of a chargeable job (the second updating process), the CPU 111 refers to the number of times that the printer was powered off during sheet output 400, and when the value referred to is smaller than a predetermined value, the CPU 111 shift the time to update the log 202 to the end of the chargeable job.

By controlling the printer 100 as the image forming apparatus as described above, for execution of a chargeable job, the control to count the number of printed sheets each time a sheet is output can be appropriately switched to the control to count the number of printed sheets at the end of the chargeable job. This reduces the number of times that processing is performed on a nonvolatile memory, and as a result, the product life of the nonvolatile memory dependent on the limitations on the number of writes, and the impact of reading and writing from and into the nonvolatile memory can be reduced.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the first and second embodiments described above, the information "X yen per sheet" is stored in the nonvolatile memory 121 as the fee structure 200, and the number of printed sheets 203 in the log 202 stored in the nonvolatile memory 121 is used for calculating a usage fee for the printer 100. The log for use in the calculation, however, may be other than the number of printed sheets 203, and which log is stored in the nonvolatile memory 121 for use in the calculation is determined or chosen based on the fee structure 200.

For example, in a case where information "unlimited use up to Z ml of each ink for Y yen" is employed for the fee structure 200, a usage fee depends on ink consumption, and therefore, not the number of printed sheets 203 but the ink consumption 204 is stored in the nonvolatile memory 121 as the log for use in calculating a usage fee for the printer 100. In another case where information "monochrome printing is free of charge" is employed for the fee structure 200, a usage fee depends on the number of times that color printing has been performed. Therefore, in this case, not the number of printed sheets 203 but the number of times that color printing has been performed 206 is stored in the nonvolatile memory 121 as the log for use in calculating a usage fee for the printer 100.

In another case where information "X1 yen per sheet in monochrome printing, and X2 yen per sheet in color printing" is employed for the fee structure 200, a usage fee depends on the number of times that color printing has been performed and the number of times that monochrome printing has been performed. Therefore, in this case, not the number of printed sheets 203 but the number of times that color printing has been performed 206 and the number of times that color printing has been performed 206 is stored in the nonvolatile memory 121 as the log for use in calculating a usage fee for the printer 100.

It should be noted that the first and second embodiments described above can also be realized by a process in which a program that implements one or more functions is supplied to a computer of an apparatus or a system via a network or a storage medium, and a system control unit of the apparatus or the system reads out and executes the program. The system control unit has one or more processors or circuits and may include a network of a plurality of separate system control units or a plurality of separate processors or circuits so as to read out and execute executable instructions.

The processors or circuits may include a central processing unit (CPU), a micro processing unit (MPU), a graphics processing unit (GPU), an application specific integrated circuit (ASIC), and a field programmable gate array (FPGA). The processors or circuits may also include a digital signal processor (DSP), a data flow processor (DFP), or a neural processing unit (NPU).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2022-192137 filed on Nov. 30, 2022 which is hereby incorporated by reference herein in its entirety.

What is claimed is:

1. An image forming apparatus comprising:
a printing unit that performs drawing on a recording medium;
an image sensor that detects completion of the drawing on the recording medium by the printing unit;
an output unit that outputs the recording medium on which the drawing has been performed;
an output sensor that detects presence or absence of the recording medium in the output unit;
a nonvolatile memory that stores first information for use in calculating a usage fee for the image forming apparatus and second information indicating whether or not the drawing on the recording medium by the printing unit is completed;
a memory storing instructions; and
at least one processor that executes the instructions to:
upon the image sensor detecting completion of the drawing on the recording medium by the printing unit during execution of a chargeable job, carry out a first updating process including updating the second information to a first state indicating completion of the drawing;

after the second information is updated to the first state, carry out a first output starting process including instructing the output unit to output the recording medium and starting monitoring of the output sensor;
carry out a second updating process in a case where it is determined that the recording medium has been output from the output unit as the output sensor being monitored no longer detects the recording medium after the output unit is instructed to output the recording medium in the first output starting process, the second updating process including updating the second information to a second state which is different from the first state and updating the first information;
terminate the chargeable job without updating the first information in a case where an error occurs in the image forming apparatus while the recording medium is detected by the output sensor being monitored after the output unit is instructed to output the recording medium in the first output starting process;
carry out a second output starting process in a case where the output sensor detects presence of a recording medium inside the output unit when the image forming apparatus is powered on, the second output starting process including instructing the output unit to output the detected recording medium, and starting monitoring of the output sensor;
read a state of the second information from the nonvolatile memory in a case where the output sensor being monitored no longer detects the recording medium inside the output unit after the output unit is instructed to output the recording medium in the second output starting process; and
carry out a third updating process including
updating the second information to the second state without updating the first information in a case where the state of the second information that has been read is the second state, and
updating the first information and then updating the second information to the second state in another case where the state of second information that has been read is the first state, wherein
the nonvolatile memory further stores a number of times that the image forming apparatus was powered off during output of recording media by the output unit, and
the at least one processor executes the instructions to:
in a case where the second information is updated to the second state in the third updating process, increase by one the number of times that the image forming apparatus was powered off, and
in a case where the number of times that the image forming apparatus was powered off is smaller than a predetermined value in the second updating process, shift a time to update the first information to an end of the chargeable job.

2. The image forming apparatus according to claim 1, wherein the first information is chosen based on a predetermined method for calculating a usage fee for the image forming apparatus.

3. The image forming apparatus according to claim 2, wherein the first information includes a number of sheets printed by the image forming apparatus.

4. The image forming apparatus according to claim 2, wherein the first information includes an amount of ink consumed by the image forming apparatus.

5. The image forming apparatus according to claim 2, wherein the first information includes a number of times that color printing has been performed by the image forming apparatus.

6. The image forming apparatus according to claim 2, wherein the first information includes a number of times that color printing has been performed by the image forming apparatus and a number of times that monochrome printing has been performed by the image forming apparatus.

7. A control method for an image forming apparatus, the image forming apparatus comprising:

a printing unit that performs drawing on a recording medium;

an image sensor that detects completion of the drawing on the recording medium by the printing unit;

an output unit that outputs the recording medium on which the drawing has been performed;

an output sensor that detects presence or absence of the recording medium in the output unit; and a nonvolatile memory that stores first information for use in calculating a usage fee for the image forming apparatus and second information indicating whether or not the drawing on the recording medium by the printing unit is completed, the control method comprising:

upon the image sensor detecting completion of the drawing on the recording medium by the printing unit during execution of a chargeable job, carrying out a first updating process including updating the second information to a first state indicating completion of the drawing;

after the second information is updated to the first state, carrying out a first output starting process including instructing the output unit to output the recording medium and starting monitoring of the output sensor;

carrying out a second updating process in a case where it is determined that the recording medium has been output from the output unit as the output sensor being monitored no longer detects the recording medium after the output unit is instructed to output the recording medium in the first output starting process, the second updating process including updating the second information to a second state which is different from the first state and updating the first information;

terminating the chargeable job without updating the first information in a case where an error occurs in the image forming apparatus while the recording medium is detected by the output sensor being monitored after the output unit is instructed to output the recording medium in the first output starting process;

carrying out a second output starting process in a case where the output sensor detects presence of a recording medium inside the output unit when the image forming apparatus is powered on, the second output starting process including instructing the output unit to output the detected recording medium, and starting monitoring of the output sensor;

reading a state of the second information from the nonvolatile memory in a case where the output sensor being monitored no longer detects the recording medium inside the output unit after the output unit is instructed to output the recording medium in the second output starting process;

carrying out a third updating process including updating the second information to the second state without updating the first information in a case where the state of the second information that has been read is the second state, and updating the first information and then updating the second information to the second state in another case where the state of second information that has been read is the first state;

in a case where the second information is updated to the second state in the third updating process, increasing by one a number of times that the image forming apparatus was powered off during output of recording media by the output unit, which is stored in the nonvolatile memory; and in a case where the number of times that the image forming apparatus was powered off is smaller than a predetermined value in the second updating process, shifting a time to update the first information to an end of the chargeable job.

8. The control method according to claim 7, wherein the first information is chosen based on a predetermined method for calculating a usage fee for the image forming apparatus.

9. A non-transitory computer-readable storage medium storing a program for causing a computer to execute a control method for an image forming apparatus, the image forming apparatus comprising:

a printing unit that performs drawing on a recording medium;

an image sensor that detects completion of the drawing on the recording medium by the printing unit;

an output unit that outputs the recording medium on which the drawing has been performed;

an output sensor that detects presence or absence of the recording medium in the output unit; and a nonvolatile memory that stores first information for use in calculating a usage fee for the image forming apparatus and second information indicating whether or not the drawing on the recording medium by the printing unit is completed, the control method comprising:

upon the image sensor detecting completion of the drawing on the recording medium by the printing unit during execution of a chargeable job, carrying out a first updating process including updating the second information to a first state indicating completion of the drawing;

after the second information is updated to the first state, carrying out a first output starting process including instructing the output unit to output the recording medium and starting monitoring of the output sensor;

carrying out a second updating process in a case where it is determined that the recording medium has been output from the output unit as the output sensor being monitored no longer detects the recording medium after the output unit is instructed to output the recording medium in the first output starting process, the second updating process including updating the second information to a second state which is different from the first state and updating the first information;

terminating the chargeable job without updating the first information in a case where an error occurs in the image forming apparatus while the recording medium is detected by the output sensor being monitored after the output unit is instructed to output the recording medium in the first output starting process;

carrying out a second output starting process in a case where the output sensor detects presence of a recording medium inside the output unit when the image forming apparatus is powered on, the second output starting process including instructing the output unit to output the detected recording medium, and starting monitoring of the output sensor;

reading a state of the second information from the non-volatile memory in a case where the output sensor being monitored no longer detects the recording medium inside the output unit after the output unit is instructed to output the recording medium in the second output starting process;

carrying out a third updating process including updating the second information to the second state without updating the first information in a case where the state of the second information that has been read is the second state, and updating the first information and then updating the second information to the second state in another case where the state of second information that has been read is the first state;

in a case where the second information is updated to the second state in the third updating process, increasing by one a number of times that the image forming apparatus was powered off during output of recording media by the output unit, which is stored in the nonvolatile memory; and in a case where the number of times that the image forming apparatus was powered off is smaller than a predetermined value in the second updating process, shifting a time to update the first information to an end of the chargeable job.

10. The non-transitory computer-readable storage medium according to claim 9, wherein the first information is chosen based on a predetermined method for calculating a usage fee for the image forming apparatus.

\* \* \* \* \*